United States Patent Office 3,540,862
Patented Nov. 17, 1970

3,540,862
SLIDING SURFACE OR RUBBING
CONTACT MATERIAL
Erich Roemer, Wiesbaden, Germany, assignor to Glyco-Metall-Werke, Daelen & Loos, GmbH, Wiesbaden, Germany, a company of Germany
Filed Sept. 15, 1965, Ser. No. 487,388
Claims priority, application Germany, Oct. 2, 1964,
G 41,684
Int. Cl. B22f 3/00
U.S. Cl. 29—182.5        7 Claims

ABSTRACT OF THE DISCLOSURE

A rubbing contact material for bearings and the like, comprising a porous member of a metal such as aluminum having great affinity for oxygen. The rubbing surface of the porous member is always oxidized. The pores of the member have a filling of an oxide of another metal which has a lesser affinity for oxygen than the base metal whereby any breaks of the oxidized surface which expose the base metal are healed by immediate oxidizing of the base metal, using oxygen which is obtained from the filling of the pores.

---

The invention relates to sliding surface or rubbing contact materials which are preferably in the form of agglomerates consisting of metallic and non-metallic components, intended for use, as an example, for bearings, seals, clutches, brakes and the like.

It is already known that sliding surface bearings may be constituted of a porous metallic sintered material in the form of a matrix, the pores of which are filled with organic substances such as mineral oil, grease or plastic materials.

It is likewise known that the pores of such a matrix may be filled with graphite or molybdenum sulfide and an adhesive.

So-called sinter-infiltration alloys are also known having pores which are filled with lead or a lead alloy.

Furthermore, the use of thin layers of lead oxide disposed on a steel backing is known. The lead oxide is as a rule partially mixed with silicon dioxide, iron oxide, aluminium oxide and boron oxide.

The lead oxide has a friction-reducing effect, especially at high temperatures. By the use of the additional materials mentioned, the melting point of the lead oxide is raised and at the same time different, very favorable temperatures are obtained at which the coefficient of friction is particularly low.

These lead oxide base layers possess the disadvantage that they can be relatively easily damaged by foreign particles and then complete destruction of the sliding surface may result.

To avoid this disadvantage, rubbing contact material has also been produced which consists of a sintered porous copper or silver substance. This porous copper or silver mass is subsequently infiltrated or steeped with lead oxide material. This material may also be lead oxide with the additives mentioned above. The important consideration with this sliding surface material is that the base material, that is the copper or silver, have a lesser affinity for oxygen than lead. An essential condition for this sliding surface material therefore, is that the lead oxide must under no circumstances be reduced by the sintered base substance. Further, it is also sufficient if the affinity for oxygen only on the surface portions of the sinter material is less than that of lead. Therefore sinter powder of iron or aluminum (having a greater affinity) can for example be used if the powder particles are coated with a material such as copper or silver (either having a lesser affinity than lead).

In any case, an antifriction material is thereby produced which has either silver or copper on its running surface. These two metals are, however, disadvantageous for the intended purpose. In the case of a copper-based sliding surface bearing material, a journal of non-hardened steel for example will become coppered in the course of time. Copper on copper then constitutes a very unfavorable coefficient of friction for mating and can easily lead to seizing of the bearing. This also applies for other metallic materials such as silver. This disadvantage is so serious that it cannot be effectively counteracted by lubricants or additives such as graphite, molybdenum sulfide, lead oxide or low-melting metals such as lead and lead alloys.

The present invention utilizes the knowledge that solid oxidic sliding surface materials have very good sliding properties when in contact with steel and the like. However, their use as antifriction bearing substances presents the difficulty that such oxidic base substances do not possess the ductility necessary for sliding surface bearings and also having a relatively low heat conductance.

Consequently the problem on which the invention is based, and an object is to produce an improved sliding surface or rubbing contact material which combines the ductility and thermal conductivity of metal with the favorable antifriction properties of solid oxide, such as aluminium oxide, magnesium oxide, titanium oxide and the like.

To solve this problem and attain the objective, the invention provides a sliding surface or rubbing contact material which consists of a base material or matrix having pores, interstices and recesses and a preferably chemically bonded filling mass having oxygen in its make-up, which completely or partially fills the pores, interstices and recesses of the base material or matrix.

According to the invention, the base material or matrix is, on the one hand, arranged to have a greater affinity for oxygen (as distinguished from the lesser affinity previously thought necessary) than the reduced filling mass and, on the other hand, possesses the property of building up a continuous oxide film on its surface and of regenerating this oxide film from the oxygen reserve in the filling mass in the event of local damage or alteration.

As long as the oxide layer on the surface of the base material or matrix remains unbroken there is no danger of the bearing seizing. Should, however, the oxide layer be locally damaged or altered either by wear or local overheating, it will in accordance with the invention be automatically regenerated or replaced from the oxygen containing reserve material of the filling mass. The partial reduction of the filling mass resulting therefrom does not present any disadvantage as was hitherto assumed.

If, for example, aluminium or an aluminium alloy is used as the base material or matrix and a filling mass of metal oxide is used having lead oxide as its chief component, the aluminium will, in the case of damage to or wear of the aluminium oxide layer, be oxidized at the damaged or worn place and thereby regenerate the aluminium oxide layer, whereas the lead oxide is reduced to lead since the aluminium has a greater affinity for oxygen than lead. Lead itself, however, is a recognized good bearing material which can in no way damage the sliding surface and has rather an advantageous than a disadvantageous effect thereon.

Moreover the production of a sliding surface or rubbing contact material according to the invention presents no difficulties. Care must, however, be taken that the base material or matrix is already coated with a relatively firm oxide layer before it comes into contact with the filling mass, so that the quantity of filling mass reduced during the filling operation or sintering is so small that a sufficient reserve of oxygen remains in the filling mass to enable the subsequent oxidation of the base material to occur when in service.

Two embodiments are hereinafter described by way of example to prove the possibility of producing the sliding surface or rubbing contact material according to the invention.

EMBODIMENT I

Figure 1:
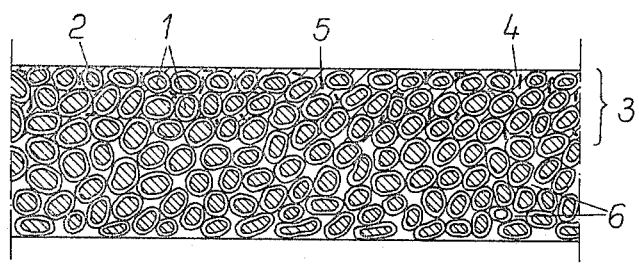
FIG. 1 is a fragmentary section, greatly magnified, through a bearing material made in accordance with the invention, with the filling material disposed in surface portions only of the specimen.

Aluminium powder with an oxide content of about 10% was pressed to a desired shape, sintered and subsequently dipped into a melt composed of about 85% PbO, 11% $B_2O_3$ and 4% $SiO_2$ maintained at a temperature of about 600° C. In the case of where the sintered aluminium had very fine pores, these were only filled with the melt of metal oxide to a depth of about 0.5 mm. because the $Al_2O_3$ dissolves or combines and thereby changes the melting point of the impregnant metal oxide so that further penetration of the latter into the sintered body or matrix is no longer possible. Using a sintered matrix with larger pores resulted in a correspondingly deeper penetration. Therefore the depth of penetration of the metal oxide into the sintered body or matrix can be largely determined beforehand by the choice of the size of pores.

EMBODIMENT II

For producing a lubricating fill which is initially incorporated as a powder in making the bearing or other part, a mixture of about 85% PbO, 11% $B_2O_3$ and 4% $SiO_2$ was melted down and subsequently again worked into powder.

This filling material powder was then mixed in different proportions as follows with aluminium oxide powder ($Al_2O_3$) containing about 10% oxygen content, pressed and sintered:

specimen (a) 10% filling mass, 90% aluminium powder,
specimen (b) 20% filling mass, 80% aluminium powder,
specimen (c) 30% filling mass, 70% aluminium powder,
specimen (d) 40% filling mass, 60% aluminium powder and
specimen (e) 50% filling mass, 50% aluminium powder.

At a sintering temperautre of 600° C. a considerable reduction of PbO into Pb was only observed when the proportion of the filling mass amounted to more than 40% of the whole material. At lower sintering temperatures no strong reduction of PbO to Pb occurred even in the case of specimens with a larger proportion of filling mass. For reasons of strength, however, a material with a proportion of filling mass less than 40% is to be preferred. The percentage of filling mass must, however, be sufficiently large so that it contains a reserve of oxygen sufficient for the regeneration or renewal of the oxide layer of the aluminium and should therefore, if possible, not be less than 5% of the whole material. A favorable percentage of filling mass is about 25% of the whole material.

When impregnating the base material with filling mass it is absolutely essential that the filling mass be liquid during the infiltration and that the softening point of the filling mass be below the melting point of the base material. The softening point may certainly change during or after the infiltration, due for example to chemical reaction with a portion of the base material or evaporation of a solvent. If, however, the base material and the filling mass are mixed before sintering, this is not absolutely necessary. It is nevertheless advantageous if the filling material is liquid during the sintering or at least is also sintered so that the filling material itself forms a solid mass and is firmly bonded with the base material.

Particularly in the case of the material used in the experiments above described, $Al_2O_3$ forms a solution with the filling mass and guarantees a sufficiently firm bonding of the filling mass on the base material or matrix.

The filling mass can also be provided with an organic adhesive such as epoxies or fluorethylen-propylen so as to improve the bonding with the matrix material and the cohesion of the filling mass itself. This is of particular importance when the matrix or base material is constructed with cavities or recesses in which the filling mass is to be accommodated.

Furthermore, by a suitable choice of the pressure exerted before the sintering as well as the sintering temperature, an additional volume of pores can be adjusted in the material so that the sliding surface or rubbing contact material is also capable of receiving oil or grease.

The use of lead oxide (litharge) as the main component of the filling mass is advantageous because lead oxide is recognized as a friction-reducing material.

By use of the proposed material the critical sliding speed at which the sliding surface material seizes can be higher or the admissible load can be increased at the same speed.

The concept of the invention is applicable not only for aluminium and its alloys but also for other materials (magnesium, titanium and their alloys) which can easily be coated with an oxide layer. The application of the concept is particularly advantageous when these other metals (such as magnesium, titanium and their alloys) are used as base or matrix materials on account of their ductility, since the finished product is thereby no longer brittle like, for example, a ceramic material.

Moreover, an advantageous application of the proposed material is to be expected when the sliding surface or rubbing contact is to take place in a neutral atmosphere or a vacuum, that is, where there is no possibility of the material being oxidized from the enviroment.

Several examples of the internal structure of the sliding surface or rubbing contact material according to the invention are illustrated in the accompanying drawings.

In the example shown in FIG. 1 a sintered body or matrix is first produced from pulverulent magnesium, aluminium or titanium. As can be seen from the drawing, each of the metal grains 1 is coated with or has on its surface an oxide layer 2. The surface of the sintered base or matrix material at the top of FIG. 1 was then dipped in a molten filling material which filled the pores 4 of the matrix to a depth indicated by 3. As the filling material cools, additional fine pores 5 form therein which are suitable for receiving oil and lubricants. The replenishment of the lubricants can be effected from the pores 6 of the sintered body which have remained free.

Figure 2:
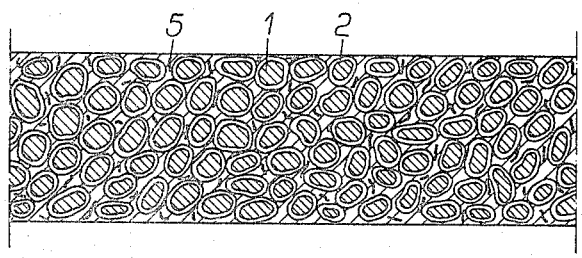
FIG. 2 is a view like that of FIG. 1, but with the specimen completely inpregnated with the filling material.

FIG. 2 shows a sliding surface or rubbing contact body which can be produced according to Embodiment II specimen (b). FIG. 2 also shows how the individual aluminium grains 1 sintered together are surface coated with or have an oxide layer 2. However, this example differs from that shown in FIG. 1 in that here the filling material is present throughout the entire thickness of the body. In this example the pressing and sintering conditions are so chosen that pores 5 are also produced in the filling material, for receiving additional lubricants.

Figure 3:
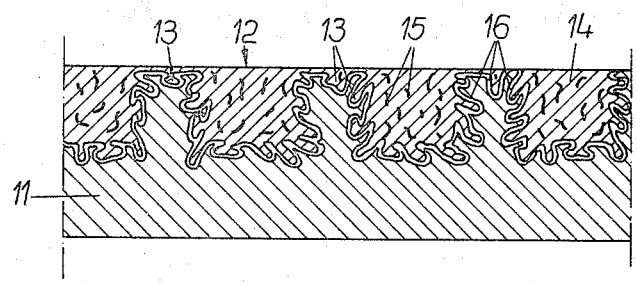
FIG. 3 is a fragmentary section, greatly magnified, through a bearing material illustrating another modification of the invention.

In the example illustrated in FIG. 3, a solid aluminium or magnesium plate 11 is shown, the active surface of which is provided with bores 12 and this surface is subsequently also etched so as to produce pores 13 along the boundary surfaces of the aluminium or magnesium grains. This plate was then surface oxidized on the side provided with the bores 12 and pores 13, as can be seen from the oxide layer 16 in FIG. 3. The bores 12 and pores 13 were then filled with liquid filling material in which on cooling additional pores 15 formed for receiving lubricant, particularly oil.

I claim:

1. A rubbing contact material comprising a base member constituted of an oxidizable metal of the group of aluminum, magnesium, titanium and their alloys, said base member having on its rubbing surface a substantially continuous coating of an oxide of said base metal, said base member having pores communicating with each other and with said rubbing surface, said pores containing a filling mass comprising lead oxide as a main component whereby any break in said oxide coating which exposes the base metal when the material is in use will be healed by formation of oxide of the base metal at said break, the oxygen for said oxide formation being supplied from the lead oxide component of the filling mass contained in said pores.

2. A sliding surface or rubbing contact material according to 1, wherein the base material comprises a porous sintered body.

3. A rubbing contact material according to claim 1, wherein the proportion of lead oxide amounts to about 5 to 50% of the total material.

4. A rubbing contact material according to claim 1, wherein the lead oxide is uniformly distributed throughout the base material and has a substantially uniform composition.

5. A rubbing contact material according to claim 1, wherein the lead oxide is provided with an organic adhesive.

6. A sliding surface or rubbing contact material according to claim 1, wherein the filling mass comprises particles uniformly dispersed throughout the base material.

7. A rubbing contact material according to claim 1, wherein the base member additionally has bores, said filling mass being also contained in said bores.

References Cited

UNITED STATES PATENTS

| 2,418,881 | 4/1947 | Hensel et al. | 29—182.5 |
| 2,894,319 | 7/1959 | Thompson | 29—182.5 |
| 3,081,196 | 3/1963 | MacDonald | 252—12 |
| 3,215,629 | 11/1965 | Weber et al. | 252—12 |

FOREIGN PATENTS

| 1,021,578 | 12/1957 | Germany. |

BENJAMIN R. PADGETT, Primary Examiner

U.S. Cl. X.R.

252—12, 12.2